(12) United States Patent
Froes et al.

(10) Patent No.: US 9,005,692 B2
(45) Date of Patent: Apr. 14, 2015

(54) DISTILLATION PROCESS

(75) Inventors: Konstantin Froes, Fairfield, NJ (US); Mary Amanda McKee, Cincinnati, OH (US); Sarah Angela Priddy, Louisville, KY (US); Susan L. Wightman, Bartow, FL (US)

(73) Assignee: Givaudan S.A., Vernier (CH)

( * ) Notice: Subject to any disclaimer, the term of this patent is extended or adjusted under 35 U.S.C. 154(b) by 268 days.

(21) Appl. No.: 13/513,375

(22) PCT Filed: Dec. 9, 2010

(86) PCT No.: PCT/EP2010/069256
§ 371 (c)(1),
(2), (4) Date: Jul. 11, 2012

(87) PCT Pub. No.: WO2011/070103
PCT Pub. Date: Jun. 16, 2011

(65) Prior Publication Data
US 2012/0276274 A1   Nov. 1, 2012

Related U.S. Application Data

(60) Provisional application No. 61/285,037, filed on Dec. 9, 2009.

(51) Int. Cl.
*A23L 1/222* (2006.01)
*A23L 1/221* (2006.01)
*C11B 9/02* (2006.01)

(52) U.S. Cl.
CPC ............ *A23L 1/2217* (2013.01); *A23L 1/2225* (2013.01); *C11B 9/022* (2013.01); *C11B 9/027* (2013.01)

(58) Field of Classification Search
CPC ......... A23L 1/22; A23L 1/221; A23L 1/2217; A23L 1/2225; C11B 9/022; C11B 9/027
USPC .................................. 426/490, 492, 650, 651
See application file for complete search history.

(56) References Cited

U.S. PATENT DOCUMENTS

| 5,558,893 A | 9/1996 | Muraldihara |
| 6,479,088 B1 | 11/2002 | Johnson |

FOREIGN PATENT DOCUMENTS

| CN | 1102344 C | 3/2003 |
| JP | 2004/018737 | 1/2004 |
| JP | 2006/291007 | 10/2006 |
| WO | WO 2008/138083 | 11/2008 |

OTHER PUBLICATIONS

PCT/EP2010/069256—International Search Report, Feb. 9, 2011.
PCT/EP2010/069256—International Written Opinion, Feb. 9, 2011.
PCT/EP2010/069256—International Preliminary Report on Patentability, Jun. 12, 2012.
Liao Chuanhua, et al, *Separation Process and Device*, China Petrochemical Press, Jul. 2008, pp. 63 and 86, 1st Edition.
Chinese Office Action for Application No. 201080055625.8; mailed Apr. 23, 2014.

*Primary Examiner* — Leslie Wong
(74) *Attorney, Agent, or Firm* — Curatolo Sidoti Co., LPA; Joseph G. Curatolo; Salvatore A. Sidoti

(57) ABSTRACT

A process of reducing the agricultural residue (AR) content of a citrus oil, comprising
- (a) vacuum batch-distilling an AR-containing cold-pressed citrus oil to give a low-AR distillate and a high-AR residue;
- (b) subjecting the high-AR residue from (a) to thin film evaporation to give a high-AR distillate and a low-AR residue;
- (c) subjecting the high-AR distillate from (b) to a further batch distillation to give a redistilled low-AR distillate and a waste high-AR redistilled residue; and
- (d) combining the distillate of (a), the residue of (b) and the redistilled distillate of (c) to give a low-AR citrus oil.

The oil thus produced has not only a reduced content of ARs such as insecticides, fungicides, herbicides and miticides, but it also contains most or even all of the desirable citrus components substantially eliminated by conventional distillation processes.

11 Claims, 1 Drawing Sheet

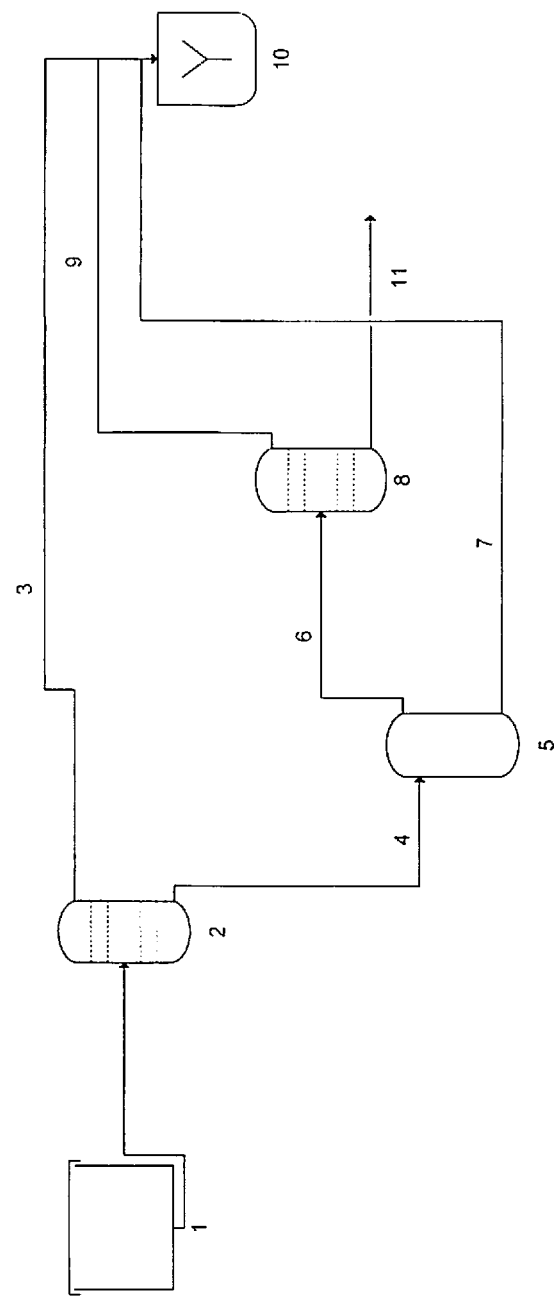

DISTILLATION PROCESS

CROSS REFERENCE TO RELATED APPLICATIONS

This application is a national stage application of International Application No. PCT/EP2010/069256, filed 9 Dec. 2010, which claims priority from U.S. Provisional Patent Application Ser. No. 61/285,037, filed 9 Dec. 2009, from which applications priority is claimed, and which are incorporated herein by reference.

This disclosure relates to citrus oils and to a process for their production.

Citrus oils, such as orange, lemon and grapefruit oils are important flavorants. They are derived by crushing the relevant fruits resulting in cold-pressed citrus oil. However, the oils thus obtained need to be purified from various residues, notably chemical residues from fertilizers, pesticides, bactericides, miticides, fungicides and the like, generally referred to as "agricultural residues" (hereinafter "ARs"). There are a great many such materials in commercial use, some of the more common including OPP (o-phenyl phenol), carbaryl, dicofol, chlorpyrifos, malathion, methidathion, ethion, phenpropathrin, bromopropylate, phosmet, imazalil, pyraclostrobin, fenbutatin oxide, propargite, prochloraz, carbendazim, diazinon, metalaxyl and thiabendazole. One way of achieving this is by thin film evaporation of cold-pressed oils under vacuum. This has the drawback that, while it does indeed get rid of the vast bulk of the ARs (left behind in the residue), low volatility citrus residues also remain behind. These include long-chain fatty acids and other non-volatiles, which are believed to contribute to mouth-feel and stability.

BRIEF DESCRIPTION OF THE DRAWING

The FIGURE is a schematic representation of an apparatus for carrying out the subject process for the production of citrus oil.

DESCRIPTION

It has now been discovered that an essentially complete citrus oil with reduced AR content may be provided by a particular process. There is therefore provided a process of reducing the AR content of a citrus oil, comprising:

(a) vacuum batch-distilling an AR-containing cold-pressed citrus oil to give a low-AR distillate and a high-AR residue;

(b) subjecting the high AR residue from (a) to thin film evaporation to give a high-AR distillate and a low-AR residue;

(c) subjecting the high-AR distillate from (b) to a further batch distillation to give a redistilled low-AR distillate and a waste high-AR redistilled residue; and (d) combining the low-AR distillate of (a), the low-AR residue of (b) and the redistilled low-AR distillate of (c) to give a low-AR citrus oil.

The terms "low-AR" and "high-AR" are used herein in a relative sense, with respect to the proportion of ARs present in an untreated citrus oil.

A batch distillation apparatus for the purposes of this disclosure comprises a vertically-disposed, multi-stage distillation column. By "multi-stage" is meant that, within the column there is provided packing that provides area for mass transfer between liquid and vapour phases. Each "stage" is defined as the packing area needed for mass transfer to reach a thermodynamic equilibrium. This packing may take the form of perforated plates placed horizontally across the column width, these plates being referred to as "stages". The more stages there are, the better the separation. The elements need not be plates but can also be structured or random packing, for example, ceramic materials or corrugated sheets arranged vertically. One particular example is Pall rings, typically of 1" (2.54 cm) size. However, the principle remains the same.

In the cases of steps (a) and (c) hereinabove described, the packing may be arranged and the column run such that the desired results, in both cases, low-R distillate/high-AR residue, are attained. The skilled person can achieve these results, using only the ordinary skill of the art in combination with routine experimentation.

A further factor in obtaining low-AR distillate/high-AR residues is a control of reflux. In steps (a) and (c) in the subject process, the reflux ratio, that is, the ratio of reflux to distillate take-off, may be kept sufficiently low, such that a very low proportion of ARs is present in the distillate. The ratio at which this will be attained will vary, depending on the individual natures of the oil and the equipment, but again the skilled person can determine a suitable ratio in every case with routine experimentation. In some cases, a minor degree of reflux will be necessary to slow down the rate of distillate take-off. A typical but non-limiting ratio is reflux/distillate up to 1. However, in a particular embodiment, no reflux is used at all, that is, there is no recycling of distilled material to the column.

In a particular embodiment, the residue exiting stage (a) is at a temperature of least about 150° C. to about 180° C. In a further particular embodiment, the distillate exiting stage (c) is at a temperature of from about 260° C. to about 320° C.

Thin film evaporation is a single-stage process in which liquid is evaporated from a heated surface under conditions of elevated temperature and high vacuum. By "single-stage" is meant that no stages as hereinabove described are involved, only a single area for mass transfer. There are a number of such thin film evaporation methods, non-limiting examples including wiped film distillation, molecular distillation and short path distillation. An advantage of high vacuum in these types of distillation is a possibility to use lower temperatures than could be used in other traditional distillations. Additionally, exposure time to heating is short, of the order of a few minutes, and it is commonly used for purification of essential oils.

In this case, the single-stage vacuum distillation is configured to give a high-AR distillate and a low-AR residue, something that, again, is well within the skill of the art and which can be determined for any desired oil with only simple experimentation. Particular, non-limiting examples of conditions useful include an absolute pressure range of from about 0.1 mm Hg to about 0.5 mm Hg, in certain embodiments more particularly about 0.2 mm Hg. The temperature of the residue exiting the distillation may be from about 110° to about 135° C., in certain embodiments more particularly, about 125° C. It should be noted that, depending on circumstances and equipment, pressures and temperatures outside these ranges may also be useful.

The resulting high-AR distillate is then transferred to a further batch distillation apparatus as described in step (c) above. The AR distillate is redistilled to provide a low-AR redistilled distillate and a waste high-AR redistilled residue. The latter residue contains a major proportion of the ARs and may be discarded.

In a final step, the oil is reconstituted by blending the low-AR distillate from step (a), the low-AR residue from step (b) and the low-AR distillate from step (c). The final product is an oil that is not only considerably reduced in AR content, but which also contains substantially all of the desirable citrus elements often excluded by conventional distillation.

The proportion of ARs remaining in the reconstituted oil is less than that of the original oil. This proportion will depend on the nature of the specific ARs, as some are harder to get rid of than others. For example, the proportion of OPP and carbaryl, two of the most common pesticides in use today, may be reduced by up to 90% by weight. Others, such as dicofol, chlorpyrifos and malathion, may be reduced by up to 50%.

The process hereinabove described may be used to distil any citrus oils and to provide a high-quality oil. There is therefore also provided a high-quality distilled citrus oil prepared by a process as hereinabove defined.

The disclosure is further described with reference to the drawing, which is a schematic representation of a particular embodiment and is not to be considered to be in any way limiting.

In a particular embodiment, the oil to be distilled is orange oil.

From a holding tank 1, a high-AR cold compressed orange oil is pumped to a first batch distillation unit 2 which may be stainless steel and may comprise a 1100 gallon capacity pot, column, and glycol chilled condenser. The pot may be heated using steam. In one embodiment, the column is 13 foot high with an 18 inch diameter, and is packed with 1 inch Pall rings. The unit can reach absolute pressures of 1 mm Hg, and pot temperatures of up to 150° C. The orange oil may be distilled starting at a pot temperature of 100° C. and absolute pressure of 75 mmHg. The distillation is carried out, gradually increasing pot temperature and decreasing system pressure until a pot temperature of 150° C., and absolute pressure of 1 mmHg is reached, and for example about 97.15% of the initial orange oil charge has distilled (about 2.85% of the initial charge remaining in the pot).

From the batch distillation unit 2, there may be derived a low-AR distillate and a high-AR residue. The low-AR distillate is passed to a final holding tank 10 along line 3, and the high-AR residue is passed via line 4 to a short path distillation unit 5. The short path distillation unit 5 may be an American Verfahrens Technische Anlagen (AVTA) GmbH unit with a 0.4 m² stainless steel heating surface with hot oil heating and a stainless steel condenser chilled with glycol. In certain embodiments, the hot oil temperature is kept at 128° C., and absolute system pressure at 0.25 mmHg. The feed rate may be between about 52.5 lb/hr/m² and 212.5 lb/hr/m² (respectively 23.81 and 96.39 Kg/hr/m²). The distillate take-off can be about 8 to 10% for orange oil, but depends on the raw material composition.

From the short path distillation unit 5 there is obtained a high-AR distillate and a low-AR residue. The high-AR distillate is passed along line 6 to a second batch distillation unit 8 and the low-AR residue is passed along line 7 to the final holding tank 10.

The second batch distillation unit 8 may be the same as distillation unit 2. By way of example, the distillation may be started at about 110° C. and absolute pressure of about 1 mm Hg to about 10 mm Hg. The distillation continues by gradually increasing the pot temperature to at least about 150° C. and decreasing the system absolute pressure of 1 mmHg. From this is obtained a low-AR redistilled distillate, which is conveyed along line 9 to the final holding tank 10, and a high waste AR redistilled waste residue, which is conveyed along line 11 for disposal.

The final contents of final holding tank 10 are a high-quality, very low AR oil, with substantially all of the flavour and mouth-feel of the original unpurified oil.

Although the embodiments have been described in detail through the above description and the preceding examples, these examples are for the purpose of illustration only and it is understood that variations and modifications can be made by one skilled in the art without departing from the scope of the disclosure. It should be understood that the embodiments described above are not only in the alternative, but can be combined.

The invention claimed is:

1. A process of reducing the agricultural residue (AR) content of a cold-pressed citrus oil, comprising:
    (a) vacuum batch-distilling an AR-containing cold-pressed citrus oil to give a low-AR distillate and a high-AR residue, wherein the terms "low-AR" and "high-AR" are relative with respect to the proportion of ARs present in untreated cold-pressed citrus oil;
    (b) subjecting the high-AR residue from (a) to single-stage vacuum distillation, to give a high-AR distillate and a low-AR residue;
    (c) subjecting the high-AR distillate from (b) to a further batch distillation to give a redistilled low-AR distillate and a waste high-AR redistilled residue; and
    (d) combining the low-AR distillate of (a), the low-AR residue of (b) and the redistilled low-AR distillate of (c) to give a reconstituted low-AR citrus oil containing citrus elements excluded by conventional distillation.

2. A process according to claim 1, in which the single-stage vacuum distillation is at least one of wiped film distillation, molecular distillation or short path distillation.

3. A process according to claim 2, in which the single-stage distillation is short path distillation.

4. A process according to claim 3, in which the short path absolute pressure is from 0.1-5.0 mmHg.

5. A process according to claim 4, in which the short path absolute pressure is 0.2 mmHg.

6. A process according to claim 3, in which the temperature of the residue exiting the short path is from 110-135° C.

7. A process according to claim 6, in which the temperature of the residue exiting the short path is 125° C.

8. A process according to claim 1, in which the degree of reflux in stages (a) and (c) is kept sufficiently low, such that there is substantially no AR in the distillate.

9. A process according to claim 8, in which reflux is not employed.

10. A process according to claim 1, in which the distillate exiting stage (a) is at a temperature of least 150° C.

11. A process according to claim 1, in which the distillate exiting stage (c) is at a temperature of from 260-320° C.

\* \* \* \* \*